E. M. KNIGHT.
WATER PURIFYING APPARATUS.
APPLICATION FILED NOV. 16, 1916.

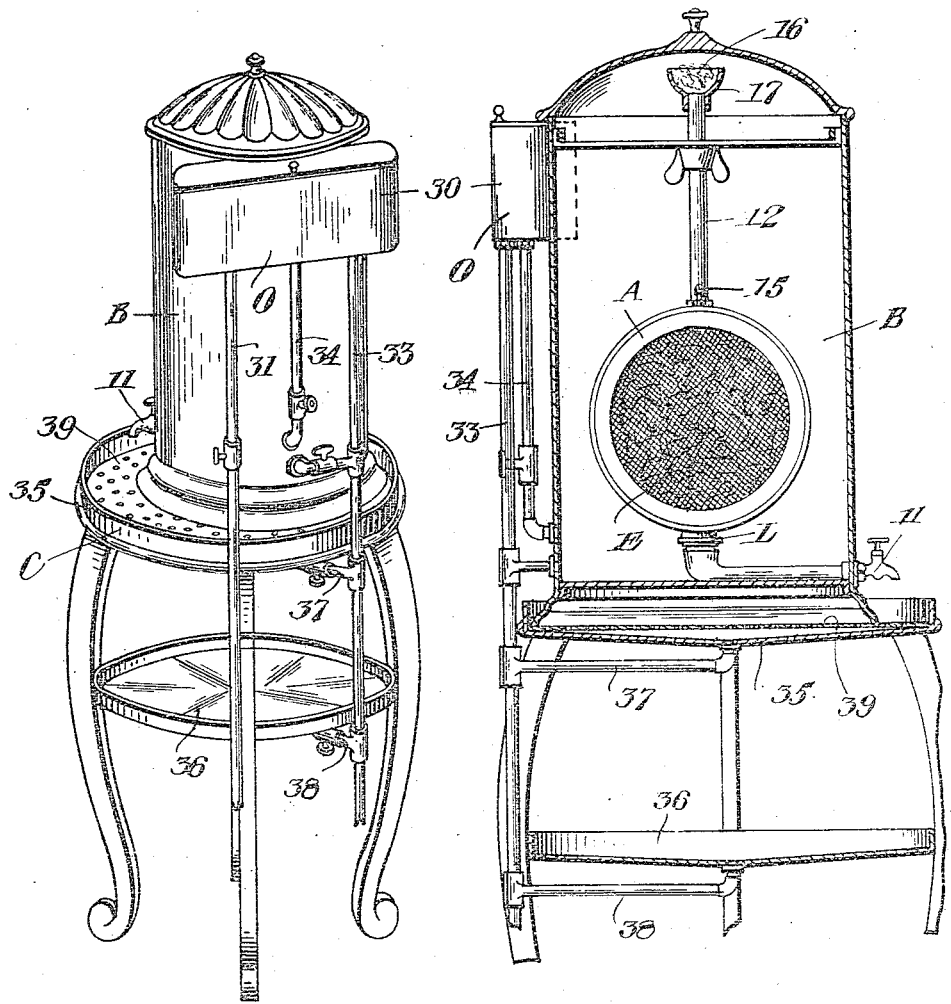

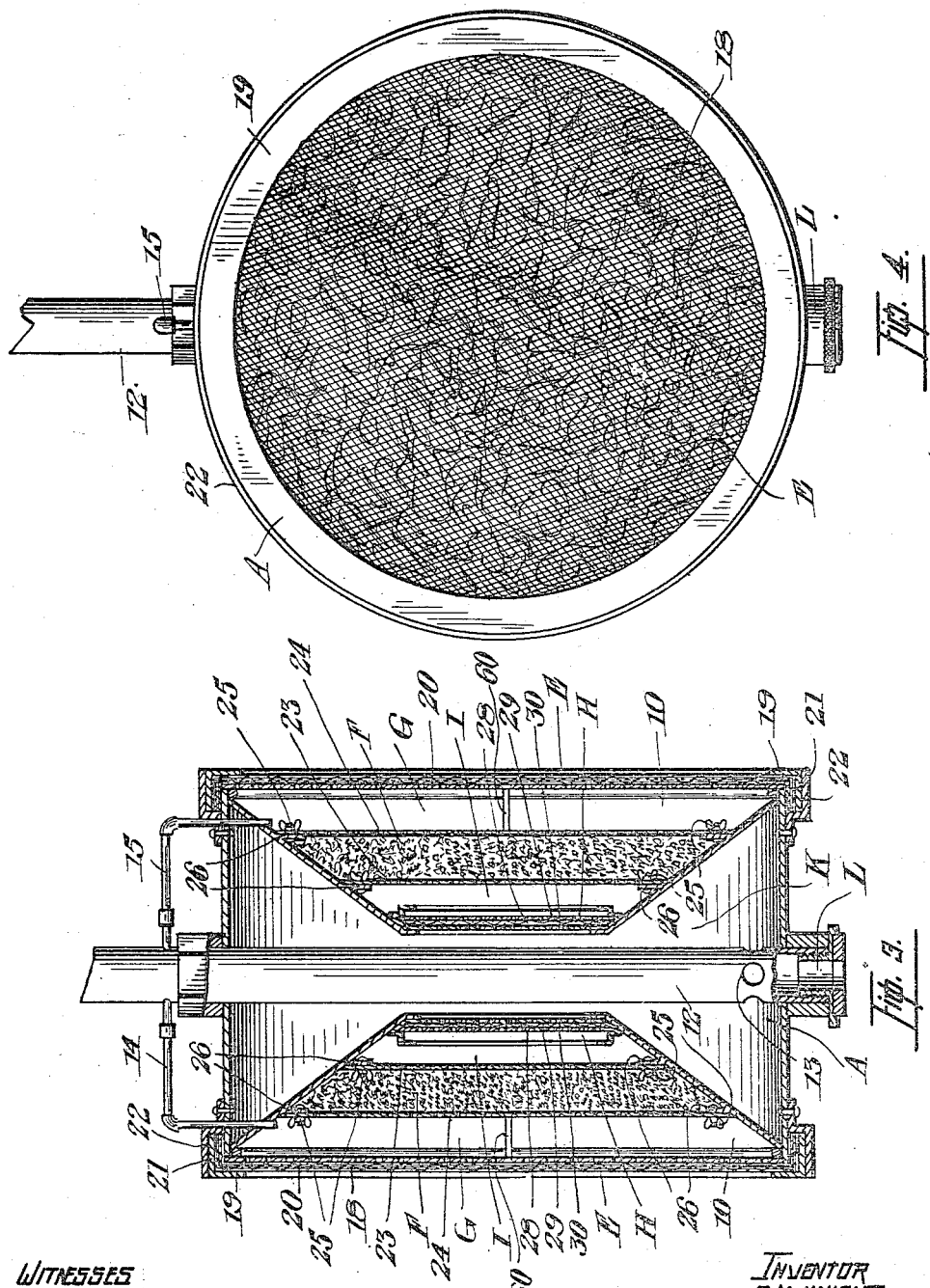

1,244,989.

Patented Oct. 30, 1917.
3 SHEETS—SHEET 3.

WITNESSES

INVENTOR
E. M. KNIGHT.
Featherstonhaugh & Co.
ATTYS.

UNITED STATES PATENT OFFICE.

EDWARD MARTIN KNIGHT, OF NEW YORK, N. Y.

WATER-PURIFYING APPARATUS.

1,244,989.  Specification of Letters Patent.  Patented Oct. 30, 1917.

Application filed November 16, 1916. Serial No. 131,719.

*To all whom it may concern:*

Be it known that I, EDWARD MARTIN KNIGHT, a citizen of the United States of America, and resident of the city of New York, in the State of New York, United States of America, have invented certain new and useful Improvements in Water-Purifying Apparatus, of which the following is a specification.

This invention relates to improvements in water purifying apparatus and the objects of the invention are to provide simple and effective means which will not only remove the matter in mechanical suspension in water or the like, but which will also remove or neutralize the organic and other objectionable matter in solution. Other objects are to generally improve and simplify the construction of the filter and to enable the various parts to better perform the functions required of them. Other objects of the invention will be clear as the specification proceeds.

For the purpose of purifying water, it is necessary that water should not only be filtered to remove the suspended matter, but that it should be chemically treated to eliminate or neutralize the organic matter in solution. This latter action is preferably carried on by a suitable oxygen carrying agent which will act to absorb one portion of the organic matter, and to oxidize another portion of the organic matter. A suitable medium of this character is carbon, conveniently in the form of animal charcoal, which has the power of absorbing gases and large quantities of atmospheric air, whereby, if water, from which all mechanically suspended matter has been removed, is brought into contact with the carbon, the organic matter in solution will at once be oxidized and rendered harmless.

To enable the carbon to act in this way it is necessary that provision should be made of an air supply for oxidization, in order that the carbon may be revivified. It is also necessary that the carbon or other contact agent should not be employed to separate the suspended mechanical matter. Therefore, in the present invention, it is proposed that first, all mechanically suspended matter should be removed by passing the water through a suitable filtering medium and then passing the filtered water into contact with the carbon under conditions which will enable the carbon to act in the manner before specified.

For the proper mechanical operation of the filtering element, it is desirable that a large superficial area should be provided for the removal of impurities, and it is also desirable that air should be introduced, both to the filtering element and to the contact or purifying element. The pressure of the water passing through both elements should be regulated, as well as the time at which the water is in contact with the purifying contact element.

In the apparatus which embodies the invention, I have shown various novel instrumentalities for simplifying and improving the mechanical operation, which construction will be apparent from the following specification.

Referring to the drawings, which illustrate the embodiment of the invention:

Figure 1 is a perspective view of an embodiment of the invention.

Fig. 2 is a vertical sectional view of the invention.

Fig. 3 is a transverse section of the filter frame.

Fig. 4 is an elevation of the face of the filter frame.

Fig. 5 is a sectional elevation of the pressure regulating means.

Like characters of reference indicate corresponding parts in the several figures.

Figure 6:
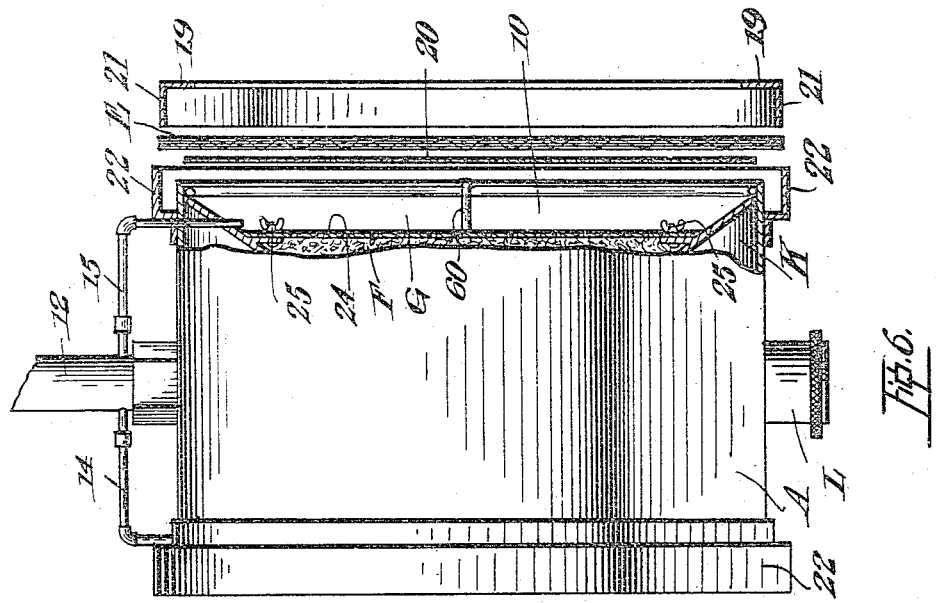
Fig. 6 is a sectional side view of the filter frame showing the elements of the filtering element supporting device separated.

Referring to the drawings, A represents what may be termed the filter frame which includes the water filtering and purifying elements hereinafter explained. This frame in the embodiment illustrated in Figs. 1 to 5 is included within the casing B of a water cooler or the like, the casing B being itself supported on a stand C.

The filter frame A is drum-like in shape and includes outer filtering elements E and inner purifying or contact elements F, spaced inwardly from the filtering elements to form air or percolating chambers G. Additional filtering elements H may be provided through which the water is passed after it has been acted upon by the purifying or contact agent. These filters are also spaced from the purifying elements to form chambers I.

The passage by which the water passes successively through the different elements are preferably constricted in order to retard the flow and insure that the water remains the desired length of time in contact with the purifying elements.

As illustrated the passage-ways are formed by conical conducting members 10 projecting inwardly from the end faces of the frame to which they may be removably or permanently secured. The center space K forms a reservoir for the purified water, which is adapted to pass therefrom through the conduit L to the faucet 11. An air inlet pipe 12 is provided for the reservoir formed at the bottom with a plurality of orifices 13. Branch air pipes 14 and 15 lead from the upper part of the pipe 12 into the chambers G. The air before passing into this pipe may be screened or filtered by a filter comprising fibrous material 16, loosely arranged in the basin or cup 17 at the open top of the pipe 12.

The filtering element E may be formed of any convenient material, such as asbestos, the essential requirement being that the interstices of the filtering medium should be smaller than the particle to be removed.

As shown the filtering medium has a bed 18 supported by a suitable frame 19 against a perforated plate 20, the frame 19 being held in by any convenient means. I have shown an annular flange 21 formed on the frame 19 adapted to enter a guide ring 22 secured to the frame A. The flange 21 and the ends of the filtering bed fit about the outer side of the frame sufficiently tight to be held by friction therein.

To give additional support to the filtering and purifying elements and to maintain them in spaced relation, pins 60 may be provided extending between the elements.

The purifying or contact elements F may be conveniently formed of animal char-coal held by suitable plates 23 and 24, suitably secured to annular flanges 25 and 26, formed on the conical elements 10.

It may be observed that these flanges also serve to prevent direct passage of water along the surface of the elements 10, and thus cause the water to travel in a circuitous manner.

The filter elements H may be similar in design to the elements E. I have shown the filter pads 28 of asbestos or the like, held by the perforated plates 29 and 30, all suitably held together and supported from the elements 10.

The supply of water to the casing B, from which the elements in the filter frame A is supplied, is desirably such as to permit the water to flow through the filter and purifying elements under gravity, and without excessive pressure which would cause channeling and other objectionable features in the elements. To provide this, while at the same time to enable the apparatus to be used in connection in water systems in which water is supplied under pressure, I provide a pressure regulating element O, conveniently mounted on the outer side of the casing B. This element, as shown in Fig. 5, includes a casing 30, a supply pipe 31 leading from a supply of water under pressure, a float valve 32, of any convenient design, whereby the outlet to the supply pipe 31 is closed when the water in the casing 30 reaches a determined level. An overflow pipe 33 may also be provided. An outlet pipe 34 leads from the casing 30 to the bottom of the casing B.

It will be noted that the casing B is cylindrical in form and the casing 30 is recessed at one side to fit the cylindrical casing.

The stand C is formed at the top with a tray 35 of greater diameter than the casing B, whereby a space will be provided for waste, glasses and other purposes. This also forms a receptacle for waste water and for the moisture that forms on the exterior of the casing B by condensation when the temperature of the water supply to the apparatus is lower than the temperature of the atmospheric air, when ice is employed in the casing B.

A second tray 36 may be provided below the first tray, adapted to receive any waste ice water and assist in evaporating the water of condensation. Both trays may be provided with drainage pipes 37 and 38. A perforated plate 39 is shown on top of the tray 35.

In the operation of the device the water to be purified is supplied to the apparatus either in its natural state or having previously been boiled, or the apparatus may be attached directly to the main service pipe of the house as shown. If the water is to be previously boiled, it will be attached to the hot water supply pipe. When the service pipe is used, the pressure regulator O will reduce the pressure down sufficiently to enable the water to percolate naturally through to the apparatus, thereby avoiding the effects of high pressure which causes a disintegration of the filtering and purifying medium and impairs very quickly the efficiency of the apparatus.

The elimination of the impurities in suspension is effected by the passage through the filtering medium E, the interstices of which are smaller than the impurities to be removed. The water thus freed from the suspended impurities passes into the chamber G, where it collects and receives air from the supply pipes 14 and 15. The water then passes into the contact or purifying elements F. The air carried by the water serves to revivify or reoxidize the filtering elements while the oxygen in contact with the elements, (which may for instance be char-coal) will act on the impurities and effect oxidization thereof. Continuing the water passes through the porous, fibrous bed H, effecting elimination of any elements which have been brought into suspension by treatment in the purifying elements.

The water, now freed from impurities, both in suspension and in solution, passes into and collects in the reservoir chamber K, whence it may be drawn off as desired.

It will be noted that the filtering elements in porous beds H, form a means for regulating the length of time with which the water is caused to remain in contact with the elements F by increasing or decreasing the density of these fibrous beds, the time the water is kept in contact with the purifying medium can be regulated to correspond compatible with the impurities to be eliminated.

Figure 7:
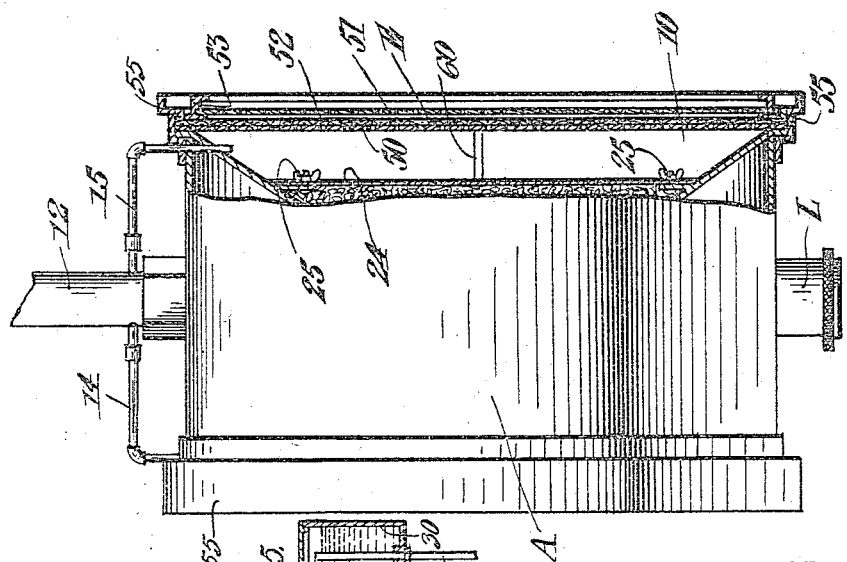
Fig. 7 is a sectional side view of the filter frame having alternative forms of support for the filtering pad.

In the alternative form shown in Fig. 7, the filtering element E comprising two perforated plates 50 and 51 between which a filtering element 52 is inserted, the outer perforated plate 51 is held in a frame 53, adapted to be engaged and frictionally retained in position within the flange 55 which extends around the periphery of the body of the filter frame.

It may be noted that there is a considerable advantage in placing the pressure regulator O on the exterior of the casing B. Were this placed on the interior, it would be in the way and would not permit the ready removal of the frame A and would also interfere with the charging of the container B with ice.

It may also be noted that the conical conducting members 10 may readily be removed and replaced and when removed they carry with them both the filtering and contact elements.

It will be seen that in Fig. 7, the member 10 is removable, while in Fig. 6, it is integral with the filter frame.

It may be noted that the chamber G, spaced inwardly from the filtering elements to form a separation of the water, also permits freer passage of the water from the filtering elements to the purifying elements, as it permits more rapid percolation. It will usually be found that the passing through the filtering bed of asbestos or the like, the water tends to sweat through and this operation is facilitated by having free passage such as the chamber G.

It is obvious that the frame and containing vessel can be made of any desired material and of any desired form or shape.

As many changes could be made in the above construction and many apparently widely different embodiments of my invention within the scope of the claims constructed without departing from the spirit or scope thereof, it is intended that all matter contained in the accompanying specification and drawings shall be interpreted as illustrative and not in a limiting sense.

What I claim as my invention is:

1. Water purifying apparatus having a submergible filtering element, a purifying element spaced from the filtering element, thereby forming a chamber between, and means for supplying air to the chamber.

2. Water purifying apparatus having a submergible asbestos filtering element adapted to remove the matter in suspension, a purifying element adapted to act on the matter in solution, an air chamber between the said elements, means for supplying air to the chamber, and a frame forming a support for both the said elements.

3. In a water purifying apparatus, a submergible frame having a gradually constricted passageway, a reservoir in the end of the passageway, a filtering element in the wider part of the passageway, a purifying element in the narrower part of said passageway, and spaced from the filtering element, to form an air chamber, and means for supplying air to the chamber.

4. Water purifying apparatus having a submergible drum-like frame having asbestos filtering elements on its end faces, purifying elements within the frame spaced from the filering elements, and means for supplying air between the purifying and filtering elements.

5. Water purifying apparatus having a submergible drum-like frame with filtering elements on its end faces, purifying elements within the frame spaced from the filtering elements, means for supplying air between the filtering and purifying elements and a water reservoir also within the frame.

6. In a water purifying apparatus having in combination a submergible drum-like frame, having asbestos filtering elements on the outer face and second filtering elements within the frame, purifying elements intermediate of the filtering elements and spaced therefrom, and means for supplying air between the first said filtering elements and the purifying elements.

7. In a water purifying apparatus, a submergible frame having a gradually constricted passageway, a filtering element in the wider part of said passageway, a purifying element in the narrower part of said passageway and spaced from the filtering element, and means for admitting air to the space between the two elements.

8. A water purifying apparatus comprising a casing, a removable filtering frame designed to be submerged therein, a reservoir contained in the filtering frame, a filtering element and a purifying element also contained within the frame, said elements being spaced apart to form a chamber between, through which air is designed to be passed.

9. Water purifying apparatus having a submergible filtering element, a purifying element containing an oxygen carrying element, and means for supplying oxygen to the water passing between the filtering element and purifying element for the revivification of the purifying element.

10. In a water purifying apparatus and in combination, a submergible frame having a gradually constricted passageway, a reservoir in the end of the passageway, a filtering element in the wider part of said passageway, a purifying element in the narrower part of said passageway and spaced from the filtering element, means for supplying air between the filtering and purifying element, and a second filtering element in the narrower part of the passageway spaced from the purifying element and through which the water is adapted to pass before passing to the reservoir.

11. In a water purifying apparatus and in combination a submergible frame having a gradually constricted passageway, a reservoir in the end of the passageway, a filtering element in the wider part of the passageway, a purifying element in the narrower part of said passageway and spaced from the filtering element, and means for admitting air both to the reservoir and to the space between the elements.

12. In a water purifying apparatus and in combination a submergible filtering element, a purifying element spaced therefrom, an air supply pipe delivering air between the said elements and an air filter at the entrance of said air supply pipe.

13. In a water purifying apparatus and in combination a reservoir, a conically constructed passageway leading to the said reservoir, a filtering element in the wider part of the passageway, a purifying element in the narrower part of the passageway and spaced from the filtering element, means for delivering air between the said filtering and purifying elements, and means for causing the water passing through the passageway to take a circuitous route.

14. In a water purifying apparatus and in combination a reservoir, an inlet passageway to the reservoir, projections on said inlet passageway adapted to cause the water to flow in a circuitous manner, a filtering element in the passageway, a purifying element spaced from the filtering element, means for passing air through the purifying element to the space between the purifying and filtering elements.

In witness whereof I have hereunto set my hand in the presence of a witness.

EDWARD MARTIN KNIGHT.

Witness:

RUSSEL B. BONART.

Copies of this patent may be obtained for five cents each, by addressing the "Commissioner of Patents, Washington, D. C."